United States Patent [19]

Daems et al.

[11] Patent Number: 5,048,918
[45] Date of Patent: Sep. 17, 1991

[54] OPTICAL FIBER CABLE TERMINATION

[75] Inventors: Daniel Daems, Berchem; Patrick Clits, Houwaart, both of Belgium

[73] Assignee: Raychem Corporation, Menlo Park, Calif.

[21] Appl. No.: 477,005

[22] Filed: Feb. 7, 1990

[51] Int. Cl.[5] .......................... G02B 6/26; G02B 6/44
[52] U.S. Cl. .................................................... 385/86
[58] Field of Search ............... 350/96.10, 96.15, 96.20, 350/96.21, 96.22, 96.23, 96.24, 320

[56] References Cited

U.S. PATENT DOCUMENTS

| 4,697,873 | 10/1987 | Bouvard et al. | 350/96.23 |
| 4,884,862 | 12/1989 | Kofod | 350/96.20 |
| 4,976,508 | 12/1990 | Okura et al. | 350/96.23 |
| 4,978,194 | 12/1990 | Allen et al. | 350/96.23 |

FOREIGN PATENT DOCUMENTS

| 0063506 | 10/1982 | European Pat. Off. | 350/96.20 X |
| 0092441 | 10/1983 | European Pat. Off. | 350/96.20 X |
| 3531693 | 3/1987 | Fed. Rep. of Germany | 350/96.22 X |
| 2500641 | 8/1982 | France | 350/96.20 X |
| 2587126 | 3/1987 | France | 350/96.23 X |
| 61-29809 | 2/1986 | Japan | 350/96.22 X |

Primary Examiner—Brian Healy
Attorney, Agent, or Firm—A. Stephen Zavell; Herbert G. Burkard

[57] ABSTRACT

An optical fibre cable is terminated by stripping back the jacket a certain length, cutting away the exposed core a shorter length, positioning an organizer a short distance from the newly formed end of the core, and providing a housing bridging the core and the organizer.

16 Claims, 2 Drawing Sheets

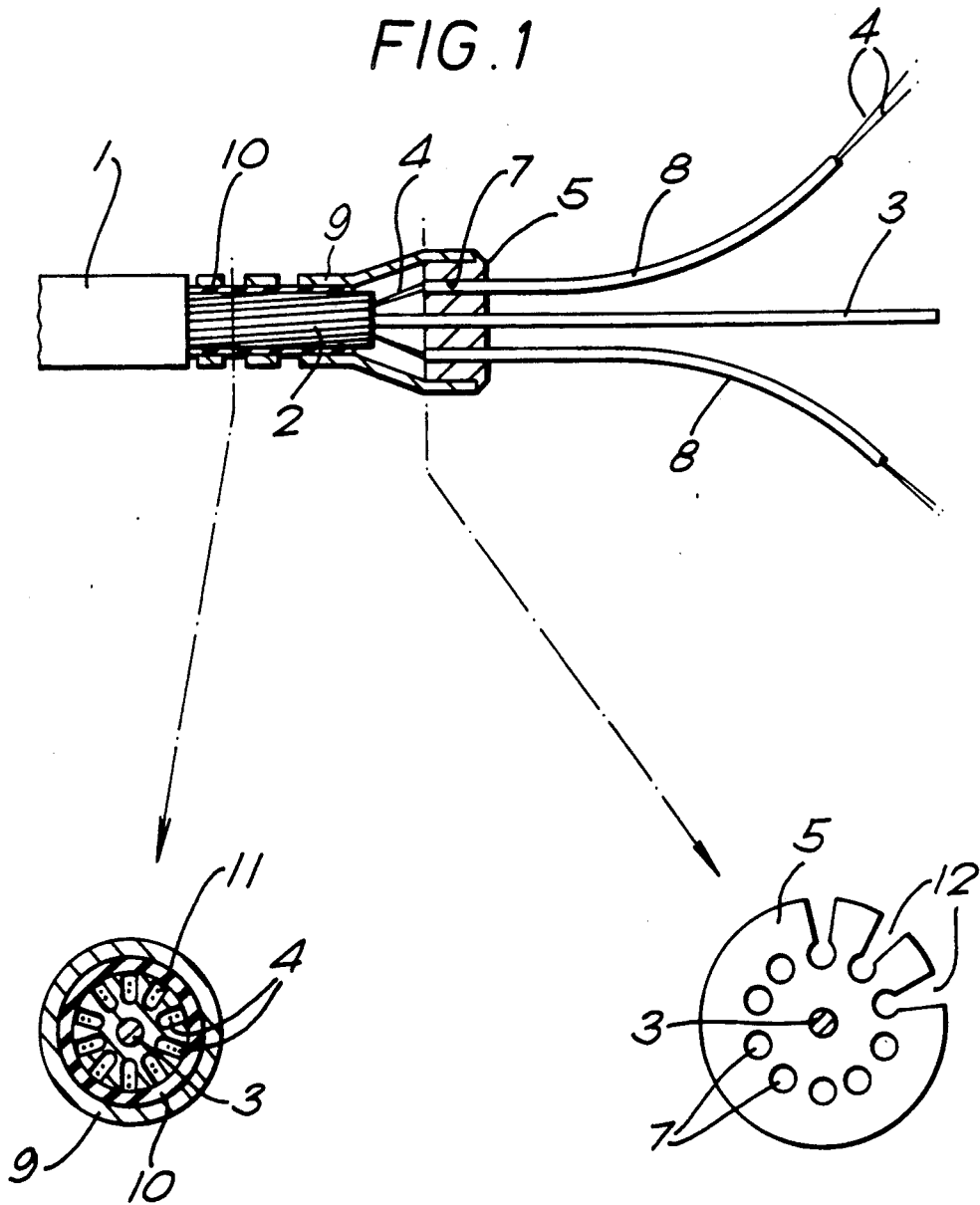

OPTICAL FIBER CABLE TERMINATION

FIELD AND BACKGROUND OF THE INVENTION

The present invention relates to the termination of cables, particularly optical fibre cables, especially cables having a core, fibres supported by the core and a jacket surrounding the core and fibres. The core may have generally longitudinally-extending grooves, often following a helical path of long pitch, within each of which lies one or more fibres. One type of such a core is known by the french word "jonc".

In this specification "terminating" includes not only complete termination of all cable where the optical signal carried is removed from the cable and applied to some other optical device, but also includes termination of one cable in preparation, for example, for splicing it to another cable or for making a branch-off of one or more parts of the signal carried into another cable or other optical device.

Where an optical fibre cable comprises a plurality of fibres, termination requires organization as well as protection of the various fibres as they leave the end of the cable. There are at least three considerations that may be made. Firstly it may be desirable that fibres leaving the end of the cable do so in orderly fashion, for example maintaining the relative positions they have in the cable, or adopting different but known relative positions. That facilitates fibre identification. Secondly the fibres should be made to follow a path that avoids excessive light loss, generally by avoiding bending at a radius of curvature greater than a certain critical radius. Thirdly, environmental protection may be required of the fibres otherwise exposed at the end of the cable.

Various techniques have been proposed for terminating optical fibre cables, and the following may be mentioned.

EP-A-0092441 (Raychem) discloses an assembly for terminating an optical fibre cable that has its fibres located in longitudinal channels of a cable core, the assembly having a plurality of polymeric sleeves for fitting over individual exposed fibres to protect them up to a cut-back end of the cable. The sleeved fibres are provided as a snap fit into longitudinal channels of a cylindrical support member (which may be referred to as an organizer) that abuts the end of the cable core. The polymeric sleeves extend past the support member into the channels of the cable core. A heat-recoverable polymeric sleeve is recovered over the end of the cable and the support member, and is provided with meltable inserts whereby the cable end is environmentally-sealed.

FR-A-2500641 (LTT) and EP-A-0063506 (LTT) disclose fibre supports through which a cable core passes, the supports having holes therethrough radially outward of a hole through which the core passes, for passage of fibres of the cable.

We have noticed various problems with the above design In particular a given product can be used with only one size of cable and can result in only one configuration of fibres leaving the end of the cable, namely that corresponding to the configuration of fibres on the cable core. The opportunity does not exist, for example, to enclose two or more fibres within the same protective tube or to alter the angular order of fibres around the support member The present invention can overcome one or more of the problems of the prior art.

SUMMARY OF THE INVENTION

The present invention provides a method of terminating an optical fibre, in which:
(a) a fibre of the cable (and preferably a plurality of fibres) is provided extending from an end of the cable;
(b) a fibre organizer is positioned at a position spaced (preferably 0.5-3, especially 0.5-2, particularly 0.75-1.5 cm) from the end of the cable and past which the fibre extends;
(c) the fibre is located by the organizer; and end of the cable.

The method may additionally comprise one or more of:
(e) surrounding with a tube that part of the fibre that extends past the organizer;
(f) positioning a bridging means between an outer surface of a part (preferably a core) of the cable and an outer surface of the organizer;
(g) providing a seal (preferably by means of an elastomeric tube) around an exposed length of core, in the case where the cable comprises a core, optical fibres supported by the core, and a jacket surrounding the core and fibres and where step (a) results from removal of a length of jacket and removal of a length of core, the length of core removed being less than that of jacket thereby leaving said exposed length of core; and
(h) surrounding with a tube at least part of a plurality of fibres that extends past the organizer, in the case where a plurality of fibres is provided in step (a) and is located in step (c).

These steps may be carried out in any suitable order. We prefer, however, that the method comprises the following steps in the order given:
(1) removal of a length of cable jacket from an end of the cable, for example from 120-200 cm;
(2) removal of a length of cable core, preferably of a length 1-10, especially 2-6 cm less than the length of jacket removed thereby leaving 2-6 cm etc. of exposed core;
(3) in either order positioning protective tubes around fibres exposed in step (1) and positioning an elastomeric tube around the exposed core remaining after steps (1) and (2) and around fibres thereon;
(4) in either order positioning an organizer at a position spaced from the newly created end of the core and locating the fibres by the organizer, preferably by passing the fibres through holes or slots in the organizer; and
(5) positioning a bridging means between the elastomeric tube and the organizer, and optionally securing it in position, for example by means of tie-wraps, preferably such that a radially compressive force is exerted on the organizer and/or on the elastomeric tube that reduces a leak path through the holes or slots in the organizer and/or between the elastomeric tube and underlying core.

The end of the cable will in general be where its integrity ends and where the fibres are no longer properly retained, for example the end of the core. The end of the strength member would clearly not be regarded as the end of the cable. It is believed that in practice the skilled worker would have no difficulty in identifying the end.

The organizer is preferably fixed in step (d) at least in part by the positioning of the bridging means. Further fixing may be provided by a strength member of the cable that runs longitudinally through the core. A length of strength member may remain protruding from the exposed core a sufficient distance for it to pass through a central hole in the organizer thereby maintaining the organizer in a position that is axial with respect to the cable. The bridging means may then fix the position of the organizer with respect to longitudinal movement The bridging means preferably encloses a space between the end of the core (or other part of the cable) and the organizer, through which space the fibre passes This space is preferably air-filled, at least initially, i.e. the fibres float free over the distance between the end of the core and the organizer. This allows them to take any of a variety of paths, thus providing freedom as regards the configuration of fibres that emerge from the organizer. The space may later be filled with a sealing material, if desired The organizer is preferably substantially cylindrical, and of diameter (or other corresponding dimension) that is different and preferably greater than the diameter of the core or other end part of the cable. The bridging means then preferably has a substantially frusto-conical portion accommodating that difference.

The bridging means is preferably of such design that it can be wrapped around the fibre or fibres, and around the core (plus elastomeric tube where present) and around the organizer. That removes the need to pass the bridging means over an end of the fibres, which may be inconvenient where a considerable length of fibres extends from the newly created end of the core. The bridging means preferably comprises half-shells, which may be secured together by securing means such as tie wraps. The bridging means preferably exerts a radially compressive force as mentioned in step (5) above, and such force may derive from such tie wraps or other securing means.

BRIEF DESCRIPTION OF THE DRAWINGS

FIG. 1 shows in cross-section an optical fibre cable terminated by the method of the invention.

DETAILED DESCRIPTION OF THE DRAWINGS

Figure 2A:
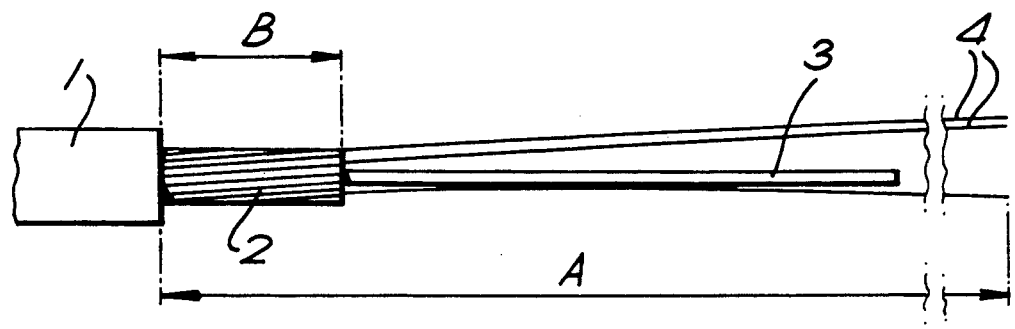
FIGS. 2a-2d show various method steps of the invention.

FIG. 1 is a longitudinal section of an optical fibre cable comprising a jacket 1 surrounding a core 2 of diameter between say 6 to 8 mm through which runs a strength member 3. The core 2 comprises a plurality of optical fibres 4 preferably in substantially longitudinally-extending grooves therein. An organizer is positioned at a position spaced from an end 6 of the core 2. The fibres pass through holes 7 in the organizer 5, and may be protected by surrounding them with tubes 8 which may terminate in holes 7 in the organizer. Bridging means 9 is positioned between an outer surface of a part of the core 2 and an outer surface of organizer 5. The bridging means 9 may surround an elastomeric (for example rubber) tube 10 or other protective means which in turn surrounds the core 2 and the fibres 4 thereon. FIG. 1 also includes transverse cross-sections through the core near the end of the cable jacket showing grooves 11 within which pairs of fibres 4 may lie, and through the organizer. Instead of holes 7, the organizer may be provided with slots 12 into which fibres 4 or tubes 8 may be laterally inserted. Some of each are shown.

FIGS. 2a-2d show preferred steps of the method of the invention. In FIG. 2a the cable jacket 1 has been stripped back a distance A, preferably 120-200 cms, and the core has been cut back a distance B, preferably about 4 cms, less. A length of strength member 3 may remain.

Figure 2B:
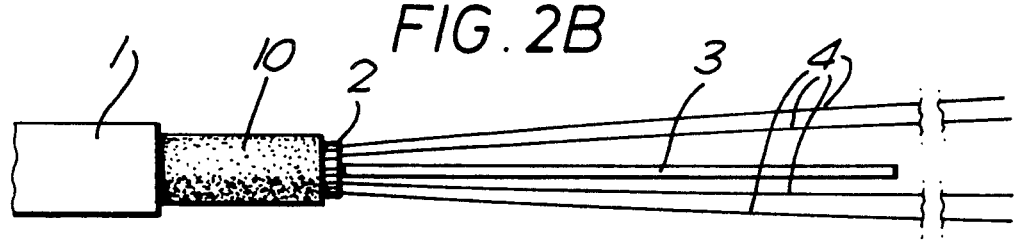
Figure 2C:
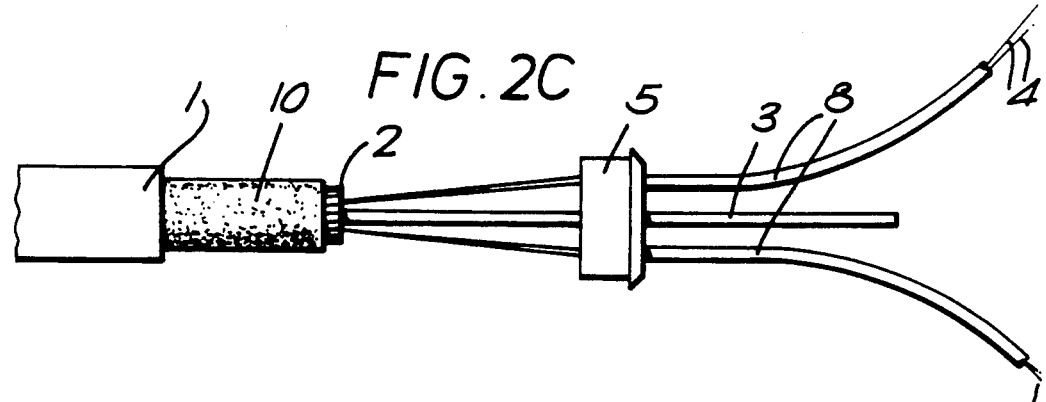
Figure 2D:
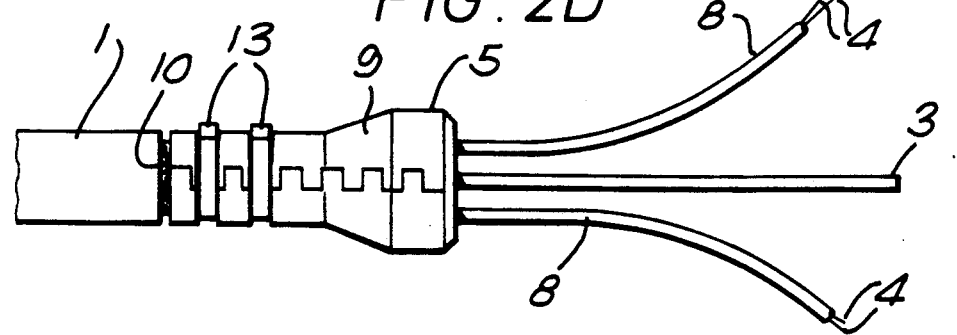

In FIG. 2b the exposed length of core 2 and overlying fibres 4 are surrounded with an elastomeric wrap or tube 10. In FIG. 2c the fibres 4 are surrounded, for example in pairs, by tubes 8, and an organizer 5 has been brought over the strength member 3 and fibres 4. This may be done by positioning ends of tubes 8 into holes 7 or slots 12 of the organizer 7, where they may be retained by interference fit or by other retaining means, then when the organizer is advanced towards the core 2, the tubes 8 are brought with it. In FIG. 2d, the organizer 5 is in the desired position, and bridging means 9 is positioned to enclose a space between the end of the core 2 and the organizer 7, and to fix the organizer in position. The bridging means can be seen to have a portion of substantially frusto-conical shape and to comprise (at least two) half-shells. The two half-shells are shown held together with tie wraps 13.

The invention allows a termination to be quickly made having excellent mechanical strength, and very low optical signal loss.

The cable breakout or termination of the invention may be used in an inlet or outlet of a larger structure, such as a cable splice closure, for example of the design marketed under the Raychem Trade Mark FOSC.

In this way, a cable termination and consequent fibre branch-out, is organized and environmentally-protected. This can be seen to be achievable without the use of adhesives or other sealing materials and without heat-shrinkable materials, although either may be employed if desired. To avoid any doubt it is noted that the invention provides a method of forming a cable termination, and also various components therefor, and also a terminated cable. Any of the various components such as organizers, protective tubes, elastomeric tubes or wraps, and bridging means may be selected.

We claim:

1. A method of terminating an optical fibre cable, in which:
    (a) a fibre of the cable is provided extending from an end of the cable;
    (b) a fibre organizer is positioned at a position spaced from the end of the cable and past which the fibre extends;
    (c) the fibre is located by the organizer; and
    (d) the organizer is fixed at a position spaced from the end of the cable and the organizer has a dimension transverse to the cable that is different from a diameter of the end of the cable, and a bridging means which has a substantially frusto-conical portion accommodating the difference.

2. A method according to claim 1, which additionally comprises:
    (e) surrounding with a tube that part of the fibre that extends past the organizer.

3. A method according to claim 2, in which an end of the tube is fixed within a hole or slot within the organizer.

4. A method according to claim 1, in which the cable has a longitudinally-extending strength member that after step (b) passes through the organizer.

5. A method according to claim 1, which additionally comprises:
(f) positioning the bridging means between an outer surface of a part of the cable and an outer surface of the organizer.

6. A method according to claim 5, in which the bridging means encloses a space between the end of the cable and the organizer, through which space the fibre passes.

7. A method according to claim 6, in which the space is substantially air-filled.

8. A method according to claim 5, in which the organizer is fixed in step (d) by the positioning of the bridging means.

9. A method according to claim 5, in which the bridging means can be wrapped around the fibre.

10. A method according to claim 9, in which the bridging means comprises half-shells.

11. A method according to claim 1, in which the cable comprises a core, optical fibres supported by the core, and a jacket surrounding the core and fibres, and step (a) results from removal of a length of jacket and removal of a length of core, the length of core removed being less than that of jacket thereby leaving an exposed length of core.

12. A method according to claim 11, which additionally comprises:
(g) providing a seal around the exposed length of core.

13. A method according to claim 12, in which step (g) is carried out by positioning an elastomeric tube around the exposed length of core.

14. A method according to claim 5, in which the bridging means provides a radially compressive force on the organizer that reduces a leak path through a hole or slot in the organizer through which the fibre passes.

15. A method according to claim 1, in which a plurality of fibres is provided in step (a) and is located in step (c).

16. A method according to claim 15, which additionally comprises:
(h) surrounding with a tube at least part of a plurality of fibres that extends past the organizer.

* * * * *

UNITED STATES PATENT AND TRADEMARK OFFICE
CERTIFICATE OF CORRECTION

PATENT NO. : 5,048,918
DATED : September 17, 1991
INVENTOR(S) : Daems et al.

It is certified that error appears in the above-indentified patent and that said Letters Patent is hereby corrected as shown below:

Column 1, line 62, replace "design" by--design.--.

Column 2, line 1, replace "member" by--member.--.

Column 2, line 13 after "and", and as a new line, insert--
(d) the organizer is fixed at a position spaced from the--.

Column 3, line 9, replace "movement" by--movement.--.

Column 3, line 12, replace "passes" by--passes.--.

Signed and Sealed this

Twenty-seventh Day of December, 1994

Attest:

BRUCE LEHMAN

*Attesting Officer*  *Commissioner of Patents and Trademarks*

UNITED STATES PATENT AND TRADEMARK OFFICE

CERTIFICATE OF CORRECTION

PATENT NO. : 5,048,918

INVENTOR(S) : September 17, 1991

DATED : Daems, et al

It is certified that error appears in the above-identified patent and that said Letters Patent is hereby corrected as shown below:

Cover page, Assignee [73], lines 1 to 2 replace "Raychem Corporation, Menlo Park, Calif." by --NV Raychem SA--.

Column 1, line 62, replace "design" by --design.--.

Column 2, line 1, replace "member" by --member.--.

Column 2, line 13 after "and", and as a new line, insert-- (d) the organizer is fixed at a position spaced from the--.

Column 3, line 9, replace "movement" by --movement.--.

Column 3, line 12, replace "passes" by --passes.--.

Signed and Sealed this

Twenty-first Day of February, 1995

Attest:

BRUCE LEHMAN

*Attesting Officer*   *Commissioner of Patents and Trademarks*